United States Patent
Kruse

(10) Patent No.: US 10,569,743 B2
(45) Date of Patent: Feb. 25, 2020

(54) FIN RAY WIPER WITH REPLACEABLE WIPER BLADE ELEMENT

(71) Applicant: Robert Bosch GmbH, Stuttgart (DE)

(72) Inventor: Michael Kruse, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 15/529,765

(22) PCT Filed: Nov. 17, 2015

(86) PCT No.: PCT/EP2015/076754
§ 371 (c)(1),
(2) Date: May 25, 2017

(87) PCT Pub. No.: WO2016/083187
PCT Pub. Date: Jun. 2, 2016

(65) Prior Publication Data
US 2017/0334399 A1 Nov. 23, 2017

(30) Foreign Application Priority Data
Nov. 26, 2014 (DE) .................. 10 2014 224 087

(51) Int. Cl.
*B60S 1/38* (2006.01)
*B60S 1/34* (2006.01)

(52) U.S. Cl.
CPC .......... *B60S 1/3801* (2013.01); *B60S 1/3427* (2013.01); *B60S 1/3886* (2013.01); *B60S 1/3894* (2013.01); *B60S 2001/3822* (2013.01)

(58) Field of Classification Search
CPC .... B60S 1/3889; B60S 1/3886; B60S 1/3887; B60S 1/3894; B60S 1/3891; B60S 1/3801;
(Continued)

(56) References Cited

U.S. PATENT DOCUMENTS 3,103,687 A * 9/1963 Golub ................... B60S 1/3801
15/250.44
3,879,794 A * 4/1975 Roberts, Jr. ........... B60S 1/3801
15/250.452

(Continued)

FOREIGN PATENT DOCUMENTS

CN 101128346 A 2/2008
CN 101946369 A 1/2011
(Continued)

OTHER PUBLICATIONS

Machine translation of description portion of German publication 3842586, published Jul. 1989. (Year: 1989).*
(Continued)

*Primary Examiner* — Gary K. Graham
(74) *Attorney, Agent, or Firm* — Michael Best & Friedrich LLP

(57) ABSTRACT

The invention relates to a windscreen wiper device for a vehicle, for wiping a windscreen (4), comprising a wiper blade (2) having an elongate upper part (10) and an elongate lower part (12) which are at least partly flexible. Also provided are multiple connecting elements (18) for connecting the upper part (10) and the lower part (12), the connecting elements being mutually spaced along a longitudinal extent (8) of the wiper blade (2) and being attached to the upper part (10) and/or the lower part (12) by a rotary joint (20), and the connecting elements (18) being designed to allow a movement of the upper part (10) and the lower part relative to each other with a movement component along the longitudinal extent (8) of the wiper blade (2). The windscreen wiper device also comprises, on the lower part (12) a receiving slot (50) on one side (57) facing towards the windscreen (4), along the longitudinal extent (8) of the wiper
(Continued)

blade (2), wherein the receiving slot (50) is designed so that a wiper blade element (51) can be exchanged.

17 Claims, 4 Drawing Sheets

(58) Field of Classification Search
CPC ............ B60S 1/3427; B60S 2001/3822; B60S 2001/3841; B60S 2001/3825
USPC ......... 15/250.361, 250.44, 250.453, 250.454
See application file for complete search history.

(56) References Cited

U.S. PATENT DOCUMENTS

| 3,958,295 A | 5/1976 | Green et al. |
| 5,862,567 A * | 1/1999 | Kim .......................... B60S 1/32 |
| | | 15/250.201 |
| 2016/0159322 A1* | 6/2016 | Weiler .................. B60S 1/3411 |
| | | 15/250.32 |

FOREIGN PATENT DOCUMENTS

| CN | 203511585 U | 4/2014 |
| DE | 3842586 A1 * | 7/1989 |
| DE | 102013214064 A1 | 5/2014 |
| EP | 0280149 | 8/1988 |
| EP | 1176070 | 1/2002 |
| EP | 1051314 B1 | 11/2005 |
| EP | 1972512 | 9/2008 |
| FR | 2563481 | 10/1985 |
| GB | 2146239 | 4/1985 |

OTHER PUBLICATIONS

International Search Report for Application No. PCT/EP2015/076754 dated Dec. 12, 2016 (English Translation, 3 pages).

* cited by examiner

FIN RAY WIPER WITH REPLACEABLE WIPER BLADE ELEMENT

BACKGROUND OF THE INVENTION

The invention relates to a window wiping apparatus for a vehicle, in particular a motor vehicle.

Window wiping apparatuses typically have a wiper arm or wiper lever, a wiper blade being moved on the window of a motor vehicle. Here, the wiper blade is moved between a first turning position and a second turning position. For this purpose, the wiper arm or the wiper blade is connected to a wiper motor via the drive shaft. The wiper blade easily loses contact with the window, in particular, on windshields with pronounced curvature changes. As a result, in particular in the case of greatly curved windows, unwiped wiping regions or fogging can occur.

Since a wiping operation has to be optimized with respect to a multiplicity of parameters, such as for example a rain quantity on the window, a snow load on the window which possibly occurs, the speed of the vehicle and the associated wind pressure on the wiper arm, fogging cannot be reliably prevented in a simple way by adaptation of the pressure of the wiper arm onto the windshield. There is therefore a requirement to further improve window wiping apparatuses.

In the case of the improvement, there are a plurality of boundary conditions which should additionally be taken into consideration. It is also a requirement here to ensure or to improve the handling and/or the ease-of-use during maintenance of the window wiper apparatus.

SUMMARY OF THE INVENTION

It is the object of the present invention to ensure reliable, largely fogging-free wiping of a window of a vehicle, a simple and inexpensive replacement of a wiper rubber or a wiping lip being provided.

According to one embodiment of the present invention, a window wiping apparatus for a vehicle, in particular a motor vehicle, is proposed. The window wiping apparatus comprises a wiper arm having a wiper blade with an elongate upper part and an elongate lower part which are of at least partially flexible configuration. Furthermore, a plurality of connecting elements for connecting the upper part and the lower part are provided, the connecting elements being spaced apart from one another along a longitudinal extent of the wiper blade and being attached on the upper part and/or the lower part by means of a rotary joint. The connecting elements are designed to make a movement possible of the upper part and the lower part relative to one another with a movement component along the longitudinal extent of the wiper blade.

Furthermore, the window wiping apparatus has a receiving slot. The receiving slot is configured along the longitudinal extent of the wiper blade on the lower part on a side which faces the window, the receiving slot being designed to receive a wiper rubber or a wiping lip replaceably.

In accordance with the embodiments of the invention which are described here, window wiping apparatuses for vehicles can be produced in a particularly inexpensive way and for a plurality of different fields of use. Furthermore, the embodiments of the invention make reliable, largely fogging-free wiping of a window of a vehicle possible, it being possible for a wiper rubber to be attached on the wiper arm of the window wiping apparatus and to be removed from it again simply and inexpensively. It is advantageous, in particular, if a used or worn wiper rubber can be replaced in a simple and inexpensive way by a new wiper rubber.

In accordance with one embodiment of the present invention, a window wiping apparatus for a vehicle, in particular a motor vehicle, is proposed. The window wiping apparatus comprises a wiper arm having a wiper blade with an elongate upper part and an elongate lower part which are of at least partially flexible configuration. Furthermore, a plurality of connecting elements for connecting the upper part and the lower part are provided, the connecting elements being spaced apart from one another along a longitudinal extent of the wiper blade and being attached on the upper part and/or the lower part by means of a rotary joint. The connecting elements are designed to make a movement possible of the upper part and the lower part relative to one another with a movement component along a longitudinal extent of the wiper blade. Furthermore, the window wiping apparatus has a receiving slot. The receiving slot is configured along the longitudinal extent of the wiper blade on the lower part on a side which faces the window, the receiving slot being designed to receive a wiper rubber replaceably.

In accordance with further embodiments, the receiving slot for the wiper rubber can extend along the longitudinal extent on an underside of the lower part from a position of the wiper blade head to a connecting position of the upper part and the lower part, which connecting position lies opposite the wiper blade head along the longitudinal extent. As large a wiping area as possible for fogging-free wiping of the window of the motor vehicle is achieved in this way.

In accordance with further embodiments, a closure mechanism can be provided at the connecting position of the upper part and the lower part of the wiper blade, which closure mechanism is designed to cover the receiving slot. In this way, the wiper rubber is secured in an expedient way against sliding out. In particular, in accordance with further embodiments, the closure mechanism can have a cap which is designed to cover that end of the receiving slot which lies at the connecting position.

In accordance with further embodiments, the cap can be attached movably on the lower part and/or on the upper part by means of a hinge. In this way, the cap is secured against loss and the handling of the closure mechanism is facilitated.

In accordance with further embodiments, the hinge can be selected from the group which consists of a joint, an integral hinge, a rotary joint, a tapered portion of the material for producing lower stiffness along a torsional axis, a joint with a rotational axis, a means for connecting the upper part to the cap or for connecting the lower part to the cap, which means permits folding in of the cap, and any combination thereof.

In accordance with further embodiments, the closure mechanism can have a latching part which is designed to latch into a cutout on the lower part. As a result, unintentional opening of the receiving slot and therefore possibly sliding of the wiper rubber out of the receiving slot can be avoided in an expedient way.

In accordance with further embodiments, the receiving slot can be designed, together with the wiper rubber, in such a way that a non-positive and/or positively locking connection are/is provided in a releasable manner. Simple handling during mounting or dismantling of the wiper rubber on the underside of the lower part is made possible in this way. Furthermore, the non-positive and/or positively locking connection can provide securing against unintentional sliding of the wiper rubber out of the receiving slot.

In accordance with further embodiments, the receiving slot can be configured in a material which is selected from the group which consists of rubber, carbon, POM, PA, TPE, in particular TPE-S, TPE-O, TPE-U, TPE-A, TPE-V and TPE-E, and any combination thereof. In this way, the advantage is achieved that physical and, in particular, mechanical properties of the lower part of the wiper arm can be adapted to a wiper rubber to be attached by way of a suitable material selection. Furthermore, it is possible to configure the lower part of the wiper arm and/or further parts of the wiper arm as integral components using injection molding, as a result of which advantages in terms of production technology are achieved which permit inexpensive manufacture.

In accordance with further embodiments, the lower part and/or the upper part can be configured in one piece with the closure mechanism. In this way, further advantages in terms of production technology can be achieved which make inexpensive manufacture of the window wiping apparatus possible.

BRIEF DESCRIPTION OF THE DRAWINGS

Exemplary embodiments of the invention are shown in the figures and will be described in greater detail in the following text. In the drawings.

DETAILED DESCRIPTION

In the following text, unless otherwise specified, identical designations are used for identical and identically acting elements.

Figure 1:
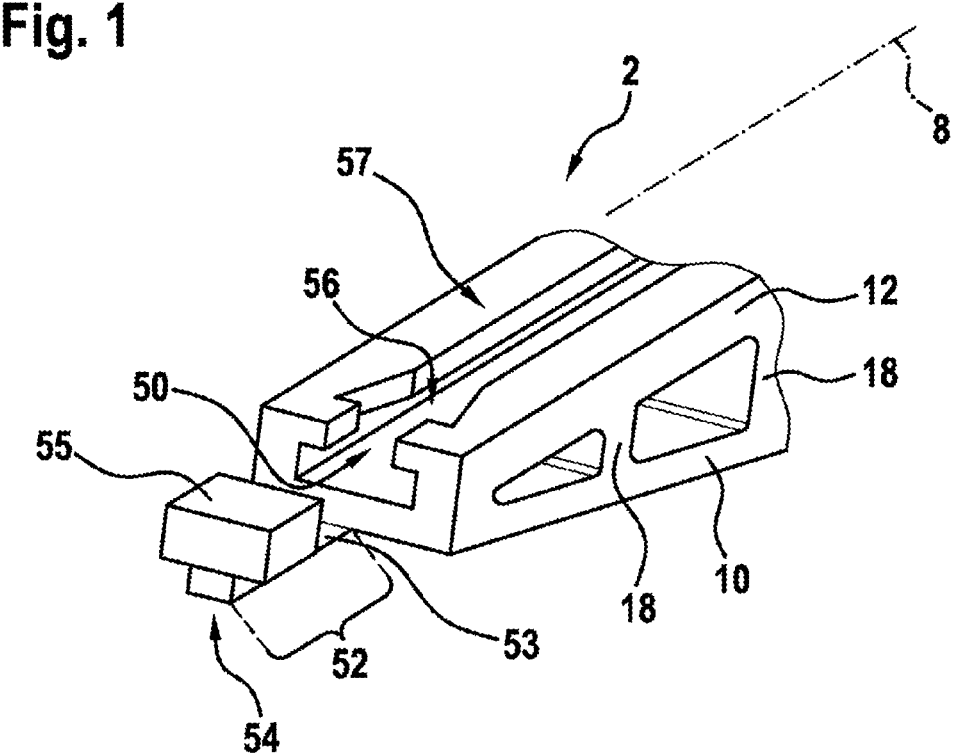
FIG. 1 shows a perspective illustration of one end of a wiper arm with a closure mechanism which is folded open, in accordance with embodiments of the invention.

FIG. 1 shows a perspective illustration of one end of a wiper blade 2 with a folded-open closure mechanism 52 of a window wiping apparatus for a vehicle, in accordance with embodiments of the invention. Window wiping apparatuses of this type typically have a wiper rubber which can be subjected to wear. It is therefore advantageous if a used or worn wiper rubber can be replaced by a new wiper rubber in a simple and inexpensive way.

As shown in FIG. 1, the wiper blade 2 has an elongate upper part 10 and an elongate lower part 12 which are of at least partially flexible configuration, the lower part 12 facing a window 4 (not shown in FIG. 1, see FIGS. 5A to 7) during operation of the window wiping apparatus. Furthermore, a plurality of connecting elements 18 for connecting the upper part 10 and the lower part 12 are provided, the connecting elements 18 being spaced apart from one another along a longitudinal extent 8 of the wiper blade and being attached on the upper part 10 and/or the lower part 12 by means of a rotary joint 20 (see, for example, FIG. 5A). The connecting elements 18 are designed to make a movement possible of the upper part 10 and the lower part 12 relative to one another with a movement component along the longitudinal extent 8 of the wiper blade 2. Here, the connecting elements are connected on the upper part 10 at a respective upper connecting position and on the lower part 12 at a respective lower connecting position. For example, in each case one rotary joint 20 is provided at the connecting positions. During a movement of the upper part 10 and of the lower part 12 relative to one another, the spacing does not change substantially of an upper connecting position from a lower connecting position on the same connecting element, that is to say the spacing is constant with deviations of, for example, ±1 mm, in particular ±0.3 mm.

Starting from the wiper blade head 70, the spacing between the upper part 10 and the lower part 12 becomes smaller along the longitudinal extent 8 of the wiper blade 2, at least in regions of the longitudinal extent of the wiper blade 2 or in a predominant part of the longitudinal extent 8 of the wiper blade 2 (see FIGS. 5A, 5B, 6 and 7). Starting from the head end, the height of the wiper blade 2 tapers in a wedge-shaped manner in regions or becomes smaller in regions of the longitudinal extent 8. For example, in accordance with embodiments for a plurality of connecting elements 18, the length of the connecting elements 18 can be provided in such a way that the connecting elements 18 which are provided in the vicinity of the wiper blade head 70 are longer than those on the opposite side of the wiper blade 2 along the longitudinal extent 8, that is to say in the vicinity of a connecting position 34.

These properties can provide a wiper blade 2 which functions in accordance with the fin ray principle.

On a side 57 of the lower part 12 which faces the window 4, the lower part 12 has a receiving slot 50 along the longitudinal extent 8 of the wiper blade 2. The receiving slot 50 is designed to receive a wiper rubber 51 or a wiping lip replaceably. The receiving slot 50 for the wiper rubber can extend along the longitudinal extent 8 of the wiper blade 2 on an underside of the lower part 12 from a position of the wiper blade head 70 (not shown in FIG. 1, see FIGS. 5A to 7) to the connecting position 34 of the upper part 10 and the lower part 12, which connecting position 34 lies opposite the wiper blade head 70 along the longitudinal extent 8. In this way, as great a wiping area as possible for fogging-free wiping of the window 4 of the motor vehicle is achieved.

In accordance with further embodiments which can be combined with embodiments which are described herein, a closure mechanism 52 can be provided at the connecting position 34 of the upper part 10 and the lower part 12 of the wiper blade 2, which closure mechanism 52 is designed to cover the receiving slot 50. In this way, a wiper rubber which has been introduced into the receiving slot 50 is secured in an expedient way against sliding out.

In accordance with further embodiments, the closure mechanism 50 can have a cap 54 which is designed to cover that end of the receiving slot 50 which lies at the connecting position 34.

In accordance with further embodiments, the cap 54 can be attached movably on the lower part 12 and/or on the upper part 10 by means of a hinge 53. In this way, the cap 54 is secured against loss and the handling of the closure mechanism 52 is facilitated. In the embodiment which is shown in FIG. 1, the cap 54 is attached movably on the upper part 10 of the wiper arm 2 by means of an integral hinge 53.

In accordance with further embodiments, the hinge 53 can be selected from the group which consists of a joint, an integral hinge, a rotary joint, a tapered portion of the material for producing lower stiffness along a torsional axis, a joint with a rotational axis, a means for connecting the upper part 10 to the cap 54 or for connecting the lower part 12 to the cap 54, which means permits folding in of the cap 54, and any combination thereof.

Figure 2:
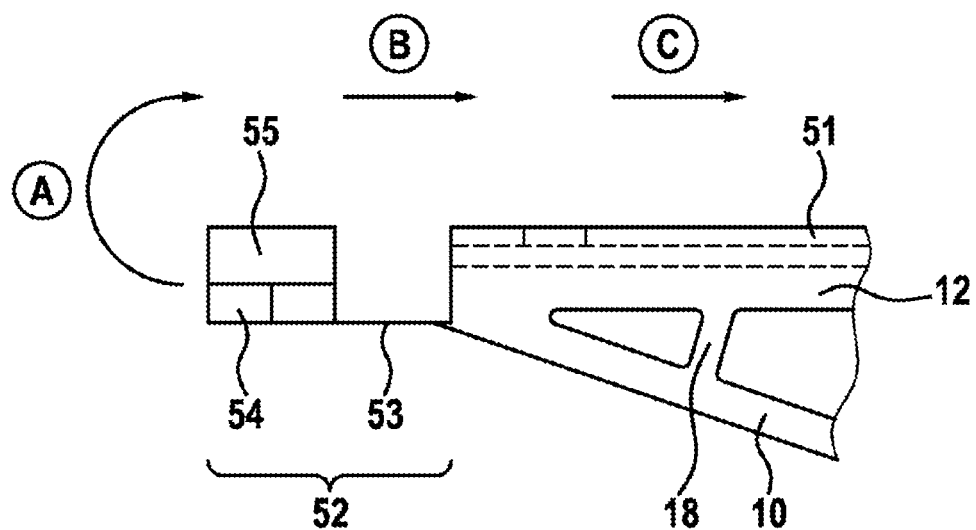
FIG. 2 shows a side view of the wiper arm end which is shown in FIG. 1, in order to clarify the method of operation of the closure mechanism, in accordance with embodiments of the invention.
Figure 3:
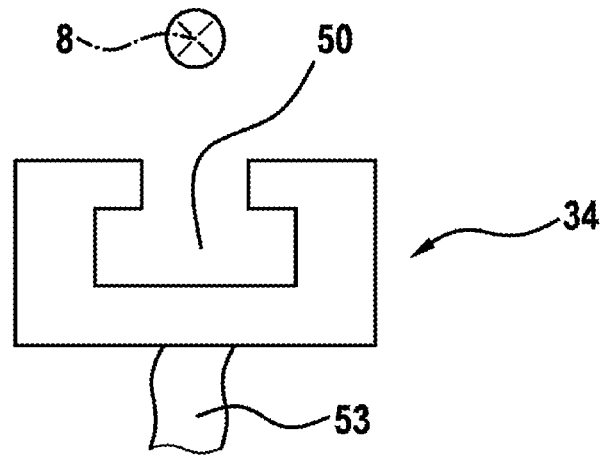
FIG. 3 shows a plan view of the wiper arm end which is shown in FIG. 1 with a hinge in the direction of the longitudinal extent of the wiper blade, in accordance with embodiments of the invention.

FIGS. 2 and 3 show further details of the closure mechanism 52 and the receiving slot 50 at or in the vicinity of the connecting position 34.

FIG. 2 is a side view of the wiper arm end which is shown in FIG. 1, for clarifying the method of operation of the closure mechanism, in accordance with embodiments of the invention. FIG. 3 is a plan view of the wiper arm end 34 which is shown in FIG. 1, with a hinge 53 in the direction of the longitudinal extent 8 of the wiper blade 2, in accordance with embodiments of the invention.

The closure mechanism 52 is shown in an open position which is labeled by a designation A in FIG. 2. In said position, a wiper rubber 51 can be introduced into the receiving slot 50 or removed from the latter. Subsequently, the cap 54 of the closure mechanism 52 which is attached movably on an integral hinge 53 can be folded upward by an angle of approximately 180° (position B).

The cap 54 has a latching part 55 which is designed to engage or latch into a cutout 56 (shown in FIG. 1) on the lower part 12 of the wiper blade 2. If the cap 54 is latched into the cutout 56 on the underside of the lower part 12, the closure mechanism 52 can assume a closed position (position C) and securing of the wiper rubber 51 or the wiping lip against its sliding out from the receiving slot 50 can be provided.

In accordance with further embodiments which can be combined with other embodiments which are described herein, the receiving slot 50 can be designed, together with the wiper rubber 51, in such a way that a non-positive and/or positively locking connection are/is provided between the receiving slot 50 and the wiper rubber 51 in a releasable manner. In this way, simple handling is made possible during mounting or dismantling of the wiper rubber 51 on the underside 57 of the lower part 12 in the receiving slot 50. Furthermore, the non-positive and/or positively locking connection can provide securing against unintentional sliding of the wiper rubber 51 out of the receiving slot 50.

In accordance with further embodiments which can be combined with embodiments which are described herein, the material, in which the receiving slot 50 is formed, that is to say, for example, the material of the lower part 12, is selected from the group which consists of rubber, carbon, POM, PA, TPE, in particular TPE-S, TPE-O, TPE-U, TPE-A, TPE-V and TPE-E, and any combination thereof. In this way, the advantage is achieved that physical and, in particular, mechanical properties of the lower part 12 of the wiper arm 2 can be adapted to a wiper rubber 51 to be attached by way of a suitable material selection. Furthermore, it is possible to configure the lower part 12 of the wiper arm 2 and/or further parts of the wiper arm 2, such as the upper part 10 and the connecting elements 18, as integral components using injection molding, as a result of which advantages in terms of manufacturing technology are achieved which permit inexpensive production of the window wiping apparatus.

In accordance with further embodiments, the lower part 12 and/or the upper part 10 can be configured in one piece with the closure mechanism 52. In this way, further advantages in terms of manufacturing technology can be achieved which make simple and inexpensive production of the window wiping apparatus possible.

Figure 4:
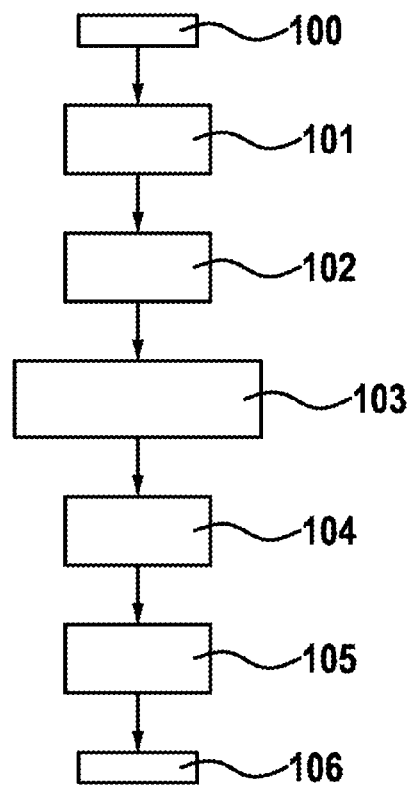
FIG. 4 shows a flow chart for clarifying steps which are performed during a replacement of a wiper rubber, in accordance with embodiments of the invention.

FIG. 4 shows a flow chart for clarifying steps which are typically performed for replacing the wiper rubber 51, in accordance with embodiments of the invention. The procedure starts in a block 100. Subsequently, the cap 54 of the closure mechanism 52 is folded open (block 101 and position A in FIG. 2). A used wiper rubber 51 can then be pulled out of the receiving slot 50 on the lower part 12 of the wiper blade 2 (block 102).

In a block 103, a new wiper rubber 51 is introduced into the receiving slot 50. Finally, the cap 54 of the closure mechanism 52, which cap 54 is attached movably on the integral hinge 53, is folded upward by an angle of approximately 180° (block 104). In a subsequent step, the cap 54 can latch into the cutout 56 (shown in FIG. 1) on the underside of the lower part 12, as a result of which the closure mechanism 52 assumes a closed position (block 105). In this way, securing of the wiper rubber 51 or the wiping lip against sliding out of the receiving slot 50 is provided. The procedure ends in a block 106.

In the following text, aspects of an exemplary window wiping apparatus will be described, for which the embodiments which are described herein of the window wiping apparatus, in particular the seating of the wiper rubber 51 in the receiving slot 50 of the lower part 12, are advantageous.

Figure 5A:
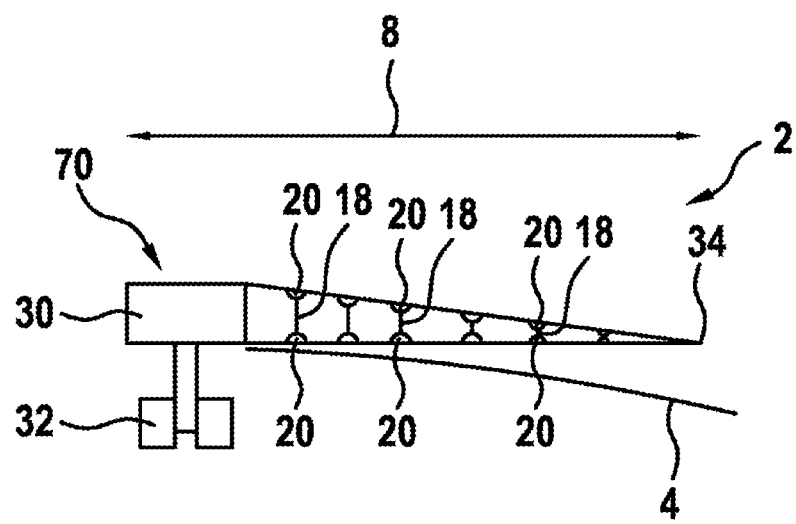
FIG. 5A shows a diagrammatic illustration of a further exemplary embodiment of a window wiping apparatus according to the invention in the form of a wiper arm with an integrated wiper blade, in a basic position.
Figure 5B:
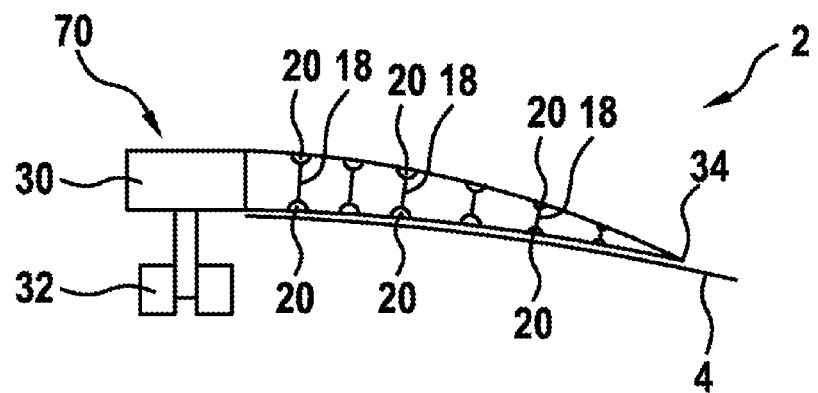
FIG. 5B shows a diagrammatic illustration of the wiper arm with an integrated wiper blade according to FIG. 5A, in a position in which it is set against a window.

FIGS. 5A and 5B show diagrammatic illustrations of a wiper blade 2 in a basic position and in a position in which it is set against a window, in accordance with embodiments of the window wiping apparatus of the disclosure. Fin ray wipers are described here, for which a receiving slot 50 for wiper rubbers 51 in accordance with the embodiments which are described here is particularly useful. The receiving slot 50 together with the closure mechanism 52 is not shown again in FIGS. 5A, 5B, 6 and 7 and also cannot be provided in said embodiments as described above. The wiper blade 2 serves to wipe the window 4 of a vehicle which is, for example, a motor vehicle, in particular a car. The wiper blade 2 has a longitudinal extent 8 and has an elongate upper part 10 and a likewise elongate lower part 12. The longitudinal extents of the upper part 10 and the lower part 12 correspond substantially to the longitudinal extent 8 of the wiper blade 2.

Both the upper part 10 and the lower part 12 are flexible bars or can be configured as flexible bars. It is likewise possible to configure only in each case one part of the upper part 10 and/or the lower part 12 so as to be flexible. In accordance with some embodiments which can be combined with the other embodiments which are described here, a material is used for the upper part 10 and/or the lower part 12, which material has a modulus of elasticity which lies in a range between 0.005 kN/mm$^2$ and 0.5 kN/mm$^2$, in particular between 0.01 kN/mm$^2$ and 0.1 kN/mm$^2$. This makes a suitable bending capability of the upper part 10 and the lower part 12 possible. Together with a cross-sectional area of suitable configuration of the upper part 10 and the lower part 12, this thus results in an optimum flexural stiffness.

The upper part 10 and the lower part 12 are fastened to a wiper blade-side fastening part 30. The window wiping apparatus can be connected by means of the wiper blade-side fastening part 30, for example with a quick fix fastening means, on the vehicle or to the drive axle of a window wiper drive unit (wiper motor) of the vehicle. A quick fix fastening means of this type can connect the drive shaft of the window wiping apparatus to the wiper arm 1 in a rapidly releasable manner.

The upper part 10 and the lower part 12 are connected at a connecting position 34 on the side which lies opposite the fastening part 30 along the longitudinal extent 8 of the window wiping apparatus. The upper part 10 and the lower part 12 are connected to one another by way of connecting elements 18. The connecting elements 18 are configured in such a way that the spacing of the connecting position with the upper part 10 and the spacing of the connecting position with the lower part 12 changes by at most ±1 mm, in particular changes by at most ±0.3 mm (for example, as a result of thermal expansion and/or tensile and compression loading). The connecting elements 18 can therefore be of substantially non-elastic configuration or the effect of the connecting elements 18 is based on their force transmission between the upper part 10 and the lower part 12 and not on their elasticity.

The connecting elements 18 are fastened by means of rotary joints 20 to inner longitudinal sides of the upper part 10 and the lower part 12 which face one another. The rotary joints 20 are typically hinges. In particular, the rotary joints 20 can be configured as integral hinges. This is advantageous, above all, when the upper part 10, the lower part 12 and/or the connecting elements 18 are/is manufactured from a plastic material or are/is coated with a suitable plastic material.

In accordance with typical embodiments which are described here and can be combined with other embodiments which are described here, a rotary joint 20 is selected from the following group which consists of: a hinge, an integral hinge, a tapered portion of the material for producing lower stiffness along a torsional axis, a joint with a rotational axis, a means for connecting the upper part to the connecting element or for connecting the lower part to the connecting element, which means permits the displacement of the lower part in relation to the upper part along the longitudinal extent, etc.

Embodiments, in which the joints are provided by way of integral hinges, therefore provide a very simple way of providing the joints for a fin ray wiper. The wiper blade 2 can be provided in one piece, in particular in a manner which dispenses with tools. In accordance with typical embodiments, the integral hinges have a high elasticity. This can be provided, for example, by way of a material selected from the group of PP, PE, POM and PA. As an alternative, the integral hinges can be manufactured from one or more materials from a group consisting of: TPE (thermoplastic elastomer), for example TPE-S, TPE-O, TPE-U, TPE-A, TPE-V and TPE-E.

The connecting elements 18 are spaced apart from one another along the longitudinal extent 8 of the wiper blade 2. The spacings are advantageously smaller than 50 mm, in particular smaller than 30 mm. As a result, particularly high flexibility of the window wiping apparatus, in particular of its lower part 12, and satisfactory adaptation to the curvature and changes in curvature of the window 4 to be wiped can be ensured.

FIG. 5B shows a diagrammatic illustration of the wiper blade 2 in accordance with FIG. 5A, in a position in which it is set against the window 4. Since the window 4 has a curvature, contact pressure forces act on the lower part 12 when the wiper blade 2 is set against the window 4. Since the upper part 10 and the lower part 12 are flexible bars and the connecting elements 12 are mounted rotatably on the upper part 10 and the lower part 12, the upper part 10 and the lower part 12 can be displaced with respect to one another. As a result of the pressure forces which act from below on the lower part 12, the wiper blade 2 bends in that direction, from which the pressure forces come, and bears precisely against the curvature of the window 4.

As a result of the construction of the embodiments which are described here, bending of the lower part 12 takes place in the direction, from which the force acts, in the case of an action of force on the lower part 12 (by way of the window 4). This is produced by way of the connection of the upper part 10 and the lower part 12 at the connecting position 34, the shape, and by way of rotary joints 20 at the connection between the connecting elements 18 and the upper or lower part. A window wiping apparatus in accordance with embodiments which are described here utilizes the effect of tail fins of certain fish which, in the case of lateral pressure, do not yield in the direction of the pressure, but rather curve in the opposite direction, that is to say in the direction, from which the pressure comes. This principle is also called the "fin ray" principle. As a result, a window wiping apparatus in accordance with the embodiments which are described herein has the advantage of an improved adaptation to a window 4 of a motor vehicle. In the case of a conventional window wiper blade, its upper part is usually of rigid configuration, that is to say it is not of flexible configuration.

Figure 6:
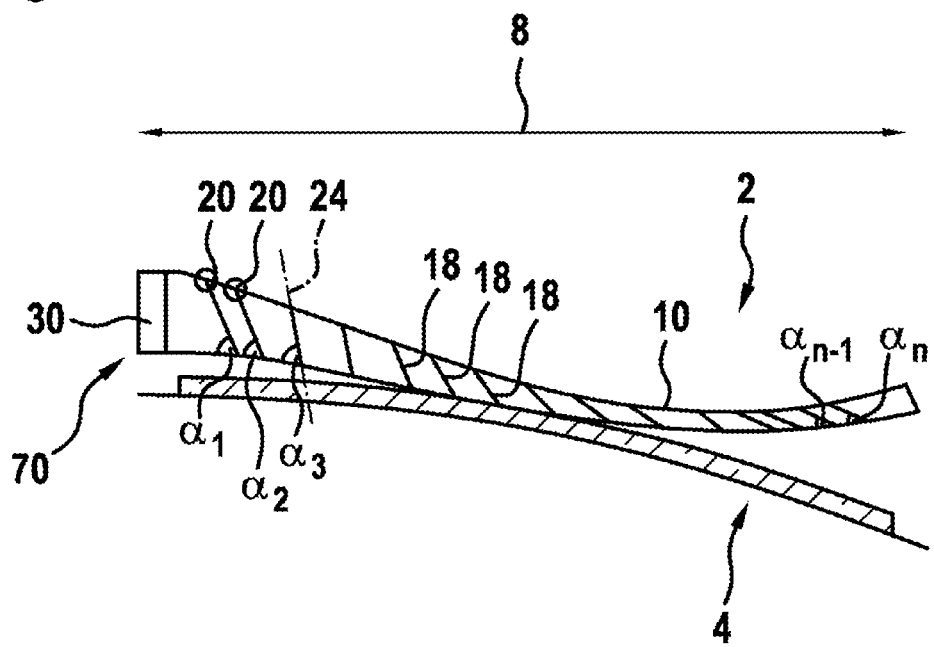
FIG. 6 shows a diagrammatic illustration of a wiper blade in accordance with embodiments of the present invention, in a basic position.
Figure 7:
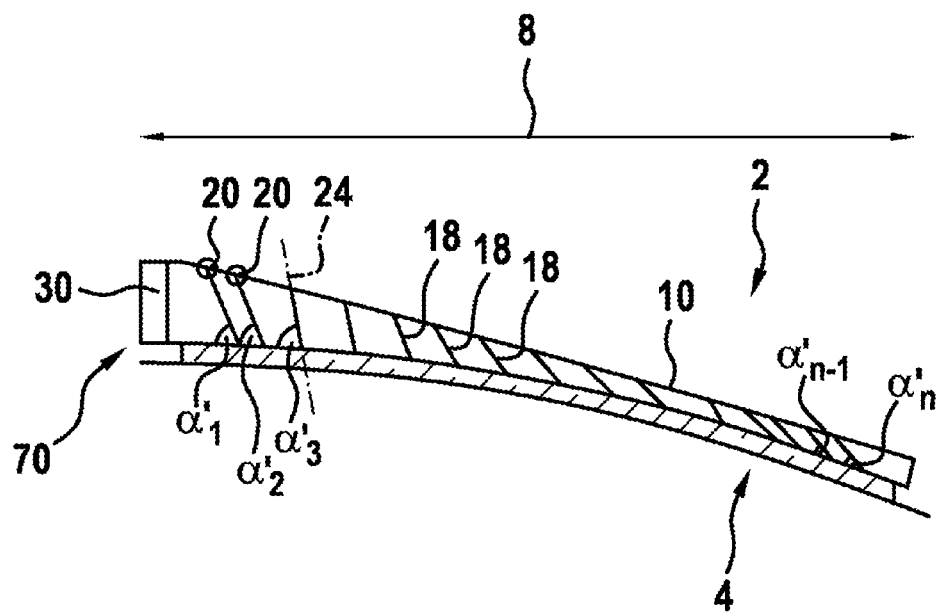
FIG. 7 shows a diagrammatic illustration of a wiper blade in accordance with embodiments of the present invention, in a position in which it is set against a window.

FIGS. 6 and 7 show diagrammatic illustrations of a wiper blade 2 of a window wiping apparatus for a vehicle, in particular for a motor vehicle, in a basic position (FIG. 6), that is to say in an unloaded state, and in a position (FIG. 7) in which it is set against a window 4, in accordance with the embodiments which are described herein. The wiper blade 2 comprises an elongate upper part 10 and an elongate lower part 12 which are of at least partially flexible configuration. Furthermore, a plurality of connecting elements 18 for connecting the upper part 10 and the lower part 12 are provided, the connecting elements 18 being spaced apart from one another along the longitudinal extent 8 of the wiper blade 2. The connecting elements 18 are designed to make a movement possible of the upper part 10 and the lower part 12 relative to one another with a movement component along the longitudinal extent 8 of the wiper blade 2. Furthermore, the connecting elements 18 are arranged relative to the lower part 12 in such a way that, in an unloaded state of the wiper blade 2, an angle $\alpha_n$ of the respective longitudinal axes 24 of the connecting elements 18 relative to the lower part 12 changes at least partially along the longitudinal extent 8 of the wiper blade 2, in particular changes continuously or changes in a monotonous or strictly monotonous manner.

In the wiper blade 2 (shown in FIG. 6) in the unloaded state, the angles $\alpha_n$ of the respective longitudinal axes 24 of the connecting elements 18 relative to the lower part 12 which change along the longitudinal extent 8 of the wiper blade 2 are denoted by $\alpha_1, \alpha_2, \alpha_3, \ldots \alpha_{n-1}, \alpha_n$. In a loaded state of the wiper blade 2, that is to say in a position in which it is set against the window 4, as shown by way of example in FIG. 7, the angles $\alpha_n$ of the respective longitudinal axes 24 of the connecting elements 18 relative to the lower part 12 change in comparison with the unloaded state. In order to express this, the angles $\alpha_n$ of the respective longitudinal axes 24 of the connecting elements 18 relative to the lower part 12 which change along the longitudinal extent 8 of the wiper blade 2, in the wiper blade (shown in FIG. 7) which is shown in a position in which it is set against the window, are denoted by $\alpha'_1, \alpha'_2, \alpha'_3 \ldots \alpha'_{n-1}, \alpha'_n$.

In accordance with embodiments of the window wiping apparatus which can be combined with other embodiments, the wiper blade 2 has at least one first region, in which the angle $\alpha_n$ of the longitudinal axis 24 of the connecting elements 18 relative to the lower part 12 decreases along the longitudinal extent 8 of the wiper blade 2 toward a wiper blade end, in particular decreases in a monotonous manner, in particular in a strictly monotonous manner. Furthermore, the wiper blade 2 can have at least one second region, in which the angle $\alpha_n$ of the longitudinal axis 24 of the connecting elements 18 relative to the lower part 12 increases along the longitudinal extent 8 of the wiper blade 2 toward a wiper blade end, in particular increases in a monotonous manner, in particular in a strictly monotonous manner. In accordance with embodiments, as shown by way of example in FIGS. 6 and 7, the second region of the wiper blade, in which the angle $\alpha_n$ of the longitudinal axis 24 of the connecting elements 18 relative to the lower part 12 increases along the longitudinal extent 8 of the wiper blade 2 toward a wiper blade end, is arranged at an inner position of the wiper blade which is situated in the vicinity of the fastening part 30 of the wiper blade 2. As a result, a window wiping apparatus can be provided which makes a particularly satisfactory adaptation to the curvature of a window 4 possible. Furthermore, a largely homogeneous pressing pressure of the window wiping apparatus on the window 4 and a homogeneous force distribution of the window wiping apparatus can be provided, with the result that a high wiping quality is provided.

In accordance with embodiments of the wiper blade 2 which can be combined with other embodiments, the connecting elements 18, in particular in an unloaded state of the wiper blade 2, are fastened to the lower part 12 in such a way that the longitudinal axes 24 of the connecting elements 18 run at angles $\alpha_n$ with respect to the lower part 12, which angles $\alpha_n$ lie between a lower angle limit value $\alpha_{nu}$ and an upper limit value $\alpha_{no}$. In accordance with embodiments, the lower angle limit value $\alpha_{nu}=10°$, in particular $\alpha_{nu}=15°$, in particular $\alpha_{nu}=20°$, and the upper angle limit value $\alpha_{no}=80°$, in particular $\alpha_{no}=90°$, in particular $\alpha_{no}=100°$. This advantageously ensures a particularly satisfactory transmission of a force which acts on the lower part 12 to the upper part 10.

In accordance with embodiments of the window wiping apparatus which can be combined with other embodiments, the connecting elements 18 are configured in such a way that the spacing between the upper part 10 and the lower part 12 changes at least partially along the longitudinal extent 8 of the wiper blade 2, in particular decreases continuously in a first region and increases continuously in a second region. The spacing between the upper part 10 and the lower part 12 along the longitudinal extent 8 of the wiper blade 2 can also comprise a region, in which the spacing between the upper part 10 and the lower part 12 is substantially constant along the longitudinal extent 8 of the wiper blade 2. The spacing between the upper part 10 and the lower part 12 is greater at the fastening part 30 than at the opposite end, at which the connecting position 34 is situated.

In accordance with embodiments of the wiper blade 2 which can be combined with other embodiments, the inner (facing the fastening part) spacing value is at least 15 mm, in particular at least 25 mm, in particular at least 35 mm. In accordance with embodiments which can be combined with other embodiments, the outer spacing value is at least 10 mm, in particular at least 12.5 mm, in particular at least 15 mm. In accordance with embodiments which can be combined with other embodiments, the middle spacing value is at least 7.5 mm, in particular at least 9 mm, in particular at least 12.5 mm.

As shown by way of example in FIGS. 6 and 7, the connecting elements 18 in accordance with embodiments which can be combined with other embodiments are connected to the lower part 12 and/or the upper part 10 in an articulated manner. In particular, the connecting elements 18 are connected to the lower part 12 and/or the upper part 10 by means of a first integral hinge 20. The first integral hinge 20 can be configured in one piece with the connecting element 18 and the upper part 10 and/or the lower part 12. The single-piece configuration of the integral hinges permits simple and inexpensive manufacture.

In accordance with embodiments of the wiper blade which can be combined with other embodiments which are described herein, the wiper blade comprises a first region with a first curvature $\omega<0$ and a second region with a second curvature $\omega>0$. Furthermore, the wiper blade in accordance with embodiments can have a third region with a third curvature $\omega<0$, the second region of the wiper blade with the second curvature $\omega>0$ being arranged between the first region with the first curvature $\omega<0$ and the third region with the third curvature $\omega<0$, as shown by way of example in FIG. 6. In this way, a window wiping apparatus can be provided, by way of which a largely homogeneous pressing pressure onto the window 4 can be realized. Furthermore, a window wiping apparatus can be provided which has an improved adaptation to the window 4 and a high wiping quality.

In accordance with further embodiments, in addition to a quick fix fastening closure which can be used for fin ray wipers and in which the entire window wiping apparatus is removed from the drive shaft on the vehicle, a mechanism can be provided, in order to lift up the wiper blade 2 of a window wiping apparatus from the window 4 or in order to place it onto said window 4. This further simplifies the utilization, for example for manual cleaning of the window 4.

What is claimed is:

1. A window wiping apparatus for wiping a window (4) of a vehicle, comprising a wiper arm (1) with a wiper blade head (70) and a wiper blade (2) which comprises:
    an elongate upper part (10) which is of at least partially flexible configuration,
    an elongate lower part (12) which is of at least partially flexible configuration, the elongate lower part (12) including a cutout (56) and
    a plurality of connecting elements (18) for connecting the upper part (10) and the lower part (12), the connecting elements (18) being spaced apart from one another along a longitudinal extent (8) of the wiper blade (2) and being attached on the upper part (10) and/or the lower part (12) by rotary joints (20)(20), the connecting elements (18) being configured to make a movement possible of the upper part (10) and the lower part (12) relative to one another with a movement component along the longitudinal extent (8) of the wiper blade (2), wherein the elongate upper part (10) and the elongate lower part (12) each extend from a wiper blade head (70) to a connecting position (34) where the elongate upper part and the elongate lower part converge together, wherein the connecting position (34) lies opposite the wiper blade head (70) along the longitudinal extent (8), and wherein the connecting elements (18) progressively become shorter in length moving along the wiper blade (2) from the wiper blade head (70) to the connecting position (34), the lower part (12) having, on a side (57) which faces the window (4), a receiving slot (50) along the longitudinal extent (8) of the wiper blade (2), the receiving slot (50) being configured to replaceably receive a wiper rubber (51), wherein the receiving slot extends from the wiper blade head (70) to the connecting position (34), wherein a closure mechanism (52) is provided at the connecting position (34), wherein the closure mechanism (52) is configured to secure the wiper rubber (51) against sliding out, wherein the closure mechanism (52) includes a latching part (55) which is configured to latch into the cutout (56) on the lower part (12), wherein the cutout (56) is defined in part by two projections extending inwardly toward one another along a width direction that is perpendicular to the longitudinal extent (8), wherein a gap is formed between the two projections, and wherein the latching part (55) has a width along the width direction that is greater than the gap.

2. The window wiping apparatus as claimed in claim 1, the closure mechanism (52) comprising a cap (54) which is configured to cover an end of the receiving slot (50) which lies at the connecting position (34).

3. The window wiping apparatus as claimed in claim 2, the cap (54) being attached movably on the lower part (12) and/or on the upper part (10) by a hinge (53).

4. The window wiping apparatus as claimed in claim 3, the hinge (53) being selected from the group which consists of a joint, an integral hinge, a rotary joint, a tapered portion of the material for producing lower stiffness along a torsional axis, a joint with a rotational axis, and a means for connecting the upper part (10) to the cap (54) or for connecting the lower part (12) to the cap (54), which means permits folding in of the cap (54), and any combination thereof.

5. The window wiping apparatus as claimed in claim 1, the receiving slot (50) being configured, together with the wiper rubber (53), in such a way that a non-positive and/or positively locking connection are/is provided in a releasable manner.

6. The window wiping apparatus as claimed in claim 1, the receiving slot (50) being configured in a material which is selected from the group which consists of rubber, carbon, POM, PA, TPE, and any combination thereof.

7. The window wiping apparatus as claimed in claim 1, the lower part (12) and/or the upper part (10) being configured in one piece with the closure mechanism (52).

8. The window wiping apparatus as claimed in claim 1, the receiving slot (50) being configured in a material which is selected from the group which consists of rubber, carbon, POM, PA, TPE-S, TPE-O, TPE-U, TPE-A, TPE-V and TPE-E, and any combination thereof.

9. The window wiping apparatus of claim 1, wherein the closure mechanism (52) includes a hinge (53) extending longitudinally away from both the upper part (10) and the lower part (12) in an unlatched position, and a cap (54) coupled to the hinge (53), such that the hinge (53) is disposed between the cap (54) and the upper and lower parts (10, 12), and the cap (54) is spaced longitudinally away from the upper part (10) and the lower part (12) in the unlatched position.

10. The window wiping apparatus of claim 9, wherein the lower part (12) includes a cutout (56) that opens into the receiving slot (50), wherein the cap (54) is configured to rotate via the hinge from the unlatched position to a latched position where the cap (54) is swung into the cutout (56) and the receiving slot (50).

11. The window wiping apparatus of claim 10, wherein the cap (54) is configured to rotate 180 degrees via the hinge (53) between the unlatched position and the latched position.

12. A window wiping apparatus for wiping a window (4) of a vehicle, comprising a wiper arm (1) with a wiper blade head (70) and a wiper blade (2) which comprises:

an elongate upper part (10) which is of at least partially flexible configuration, an elongate lower part (12) which is of at least partially flexible configuration, and a plurality of connecting elements (18) for connecting the upper part (10) and the lower part (12), the connecting elements (18) being spaced apart from one another along a longitudinal extent (8) of the wiper blade (2) and being attached on the upper part (10) and/or the lower part (12) by rotary joints (20), the connecting elements (18) being configured to make a movement possible of the upper part (10) and the lower part (12) relative to one another with a movement component along the longitudinal extent (8) of the wiper blade (2), wherein the elongate upper part (10) and the elongate lower part (12) each extend from a wiper blade head (70) to a connecting position (34) where the elongate upper part and the elongate lower part converge together, wherein the connecting position (34) lies opposite the wiper blade head (70) along the longitudinal extent (8), and wherein the connecting elements (18) progressively become shorter in length moving along the wiper blade (2) from the wiper blade head (70) to the connecting position (34), the lower part (12) having, on a side (57) which faces the window (4), a receiving slot (50) along the longitudinal extent (8) of the wiper blade (2), the receiving slot (50) being configured to replaceably receive a wiper rubber (51), wherein the receiving slot extends from the wiper blade head (70) to the connecting position (34), wherein a closure mechanism (52) is provided at the connecting position (34), wherein the closure mechanism (52) is configured to secure the wiper rubber (51) against sliding out, wherein the closure mechanism (52) includes a hinge (53) extending longitudinally away from both the upper part (10) and the lower part (12) in an unlatched position, and a cap (54) coupled to the hinge (53), such that the hinge (53) is disposed between the cap (54) and the upper and lower parts (10, 12), and the cap (54) is spaced longitudinally away from the upper part (10) and the lower part (12) in the unlatched position, wherein the lower part (12) includes a cutout (56) that opens into the receiving slot (50), wherein the cap (54) is configured to rotate via the hinge from the unlatched position to a latched position where the cap (54) is swung into the cutout (56) and the receiving slot (50), and wherein the cap (54) is configured to rotate 180 degrees via the hinge (53) between the unlatched position and the latched position.

13. The window wiping apparatus of claim 12, wherein the hinge (53) is selected from the group which consists of a joint, an integral hinge, a rotary joint, a tapered portion of the material for producing lower stiffness along a torsional axis, a joint with a rotational axis, and a means for connecting the upper part (10) to the cap (54) or for connecting the lower part (12) to the cap (54), which means permits folding in of the cap (54), and any combination thereof.

14. The window wiping apparatus as claimed in claim 12, the receiving slot (50) being configured, together with the wiper rubber (53), in such a way that a non-positive and/or positively locking connection are/is provided in a releasable manner.

15. The window wiping apparatus as claimed in claim 12, the receiving slot (50) being configured in a material which is selected from the group which consists of rubber, carbon, POM, PA, TPE, and any combination thereof.

16. The window wiping apparatus as claimed in claim 12, the lower part (12) and/or the upper part (10) being configured in one piece with the closure mechanism (52).

17. The window wiping apparatus as claimed in claim 12, the receiving slot (50) being configured in a material which is selected from the group which consists of rubber, carbon, POM, PA, TPE-S, TPE-O, TPE-U, TPE-A, TPE-V and TPE-E, and any combination thereof.

* * * * *